(12) United States Patent
Nakamura et al.

(10) Patent No.: US 11,814,068 B2
(45) Date of Patent: Nov. 14, 2023

(54) AUTOMATED DRIVING SYSTEM

(71) Applicant: Toyota Jidosha Kabushiki Kaisha, Toyota (JP)

(72) Inventors: Hiroshi Nakamura, Tokyo-to (JP); Akihide Tachibana, Tokyo-to (JP); Katsuhiro Sakai, Kawasaki (JP); Kentaro Ichikawa, Shizuoka-ken (JP); Taisuke Sugaiwa, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 17/174,699

(22) Filed: Feb. 12, 2021

(65) Prior Publication Data
US 2021/0300406 A1 Sep. 30, 2021

(30) Foreign Application Priority Data
Mar. 30, 2020 (JP) .................... 2020-060835

(51) Int. Cl.
*G01C 21/36* (2006.01)
*G01C 21/34* (2006.01)
*B60W 30/18* (2012.01)
*B60W 60/00* (2020.01)

(52) U.S. Cl.
CPC .... *B60W 60/001* (2020.02); *B60W 30/18109* (2013.01); *G01C 21/3438* (2013.01); *G01C 21/3605* (2013.01)

(58) Field of Classification Search
CPC ......... B60W 60/001; B60W 30/18109; B60W 30/06; B60W 2552/00; B60W 2552/05; B60W 2552/50; B60W 2552/53; B60W 60/00253; G01C 21/3438; G01C 21/3605; G01C 21/3685; G08G 1/096708; G08G 1/096725; G08G 1/143
See application file for complete search history.

(56) References Cited

U.S. PATENT DOCUMENTS

| | | | |
|---|---|---|---|
| 9,773,413 B1 * | 9/2017 | Li | G08G 1/146 |
| 2018/0056990 A1 * | 3/2018 | Elie | G01B 11/22 |
| 2018/0082219 A1 * | 3/2018 | Bryson | G01C 21/206 |
| 2018/0122245 A1 * | 5/2018 | Penilla | G06Q 30/0643 |
| 2018/0188731 A1 * | 7/2018 | Matthiesen | G01C 21/3407 |
| 2020/0013288 A1 * | 1/2020 | Stefik | G06Q 50/30 |
| 2020/0262453 A1 * | 8/2020 | Mimura | G06Q 50/30 |

FOREIGN PATENT DOCUMENTS

| | | |
|---|---|---|
| CN | 105810011 A | 7/2016 |
| WO | 2019065696 A1 | 4/2019 |

* cited by examiner

*Primary Examiner* — Yuen Wong
*Assistant Examiner* — Ibrahim Abdoalatif Alsomairy
(74) *Attorney, Agent, or Firm* — Dinsmore & Shohl LLP

(57) ABSTRACT

An automated driving system controls an automated driving vehicle. A plurality of stop lots are virtually arranged in a pick-up and drop-off area in which the automated driving vehicle stops to pick up or drop off a user. An order of priority of the plurality of stop lots is set. The automated driving system selects a stop lot one by one in the order of priority and determines whether or not the selected stop lot is available for the automated driving vehicle to stop. When the selected stop lot is available for the automated driving vehicle to stop, the selected stop lot is set as a target stop lot. The automated driving system controls the automated driving vehicle so as to stop in the target stop lot.

4 Claims, 15 Drawing Sheets

AUTOMATED DRIVING SYSTEM

CROSS-REFERENCE TO RELATED APPLICATION

This application claims priority to Japanese Patent Application No. 2020-060835 filed on Mar. 30, 2020, the entire contents of which are herein incorporated by reference.

BACKGROUND

Technical Field

The present disclosure relates to an automated driving system that controls an automated driving vehicle. In particular, the present disclosure relates to an automated driving system that controls an automated driving vehicle providing a driverless transportation service.

Background Art

Patent Literature 1 discloses a feature data structure indicating features (i.e., objects existing on a ground). The feature data structure includes stop position information indicating a stop position at which an automated driving vehicle visiting a feature should stop with respect to the feature.

LIST OF RELATED ART

Patent Literature 1: International Publication No. WO2019/065696

SUMMARY

A driverless transportation service utilizing an automated driving vehicle has been proposed. The automated driving vehicle picks up a user and then autonomously travels to a destination. When arriving at the destination, the automated vehicle drops off the user.

A facility such as a hotel, a building, a station, an airport, and the like is sometimes provided with a predetermined pick-up and drop-off area (carriage porch) in which the automated driving vehicle stops to pick up or drop off the user. When making the automated driving vehicle stop in such the predetermined pick-up and drop-off area, it is desirable to efficiently determine a stop position in the pick-up and drop-off area.

Patent Literature 1 does not disclose how to determine a stop position in such a predetermined pick-up and drop-off area. There is room for improvement in how to determine a stop position for an automated driving vehicle in a predetermined pick-up and drop-off area.

An object of the present disclosure is to provide a technique that can efficiently determine a stop position in a predetermined pick-up and drop-off area when making an automated driving vehicle stop in the predetermined pick-up and drop-off area.

An automated driving system controls an automated driving vehicle providing a driverless transportation service to a user. A pick-up and drop-off area is a predetermined area in which the automated driving vehicle stops to pick up or drop off the user. A plurality of stop lots are virtually arranged in the pick-up and drop-off area. The automated driving system includes: a processor configured to control the automated driving vehicle; and a memory configured to store stop lot information indicating positions and an order of priority of the plurality of stop lots, and surrounding situation information indicating a situation around the automated driving vehicle. The processor selects a stop lot of a highest order of priority among the plurality of stop lots based on the stop lot information. The processor executes a determination process that determines, based on the positions indicated by the stop lot information and the surrounding situation information, whether or not the selected stop lot is available for the automated driving vehicle to stop. When the selected stop lot is not available for the automated driving vehicle to stop, the processor selects a stop lot of a next order of priority to execute the determination process. When the selected stop lot is available for the automated driving vehicle to stop, the processor sets the selected stop lot as a target stop lot. Then, the processor controls the automated driving vehicle so as to stop in the target stop lot.

According to the present disclosure, there is no need to haphazardly search the pick-up and drop-off area for an available (vacant) space in which the automated driving vehicle can be stopped. The reason is that the plurality of stop lots are virtually arranged in the pick-up and drop-off area and further the order of priority of the plurality of stop lots is set. The automated driving system can select a stop lot one by one in the order of priority and determine whether or not the selected stop lot is available for the automated driving vehicle to stop. When the selected stop lot is available for the automated driving vehicle to stop, the selected stop lot is set as the target stop lot. Such the method makes it possible to efficiently determine the stop position (target stop lot) in the pick-up and drop-off area. Since the stop position can be efficiently determined, a computational load imposed on the automated driving system is reduced. Moreover, a time required for the automated driving vehicle to make a stop also is reduced.

DETAILED DESCRIPTION

Embodiments of the present disclosure will be described with reference to the accompanying drawings.

1. First Embodiment 1-1. Driverless Transportation Service

Figure 1:
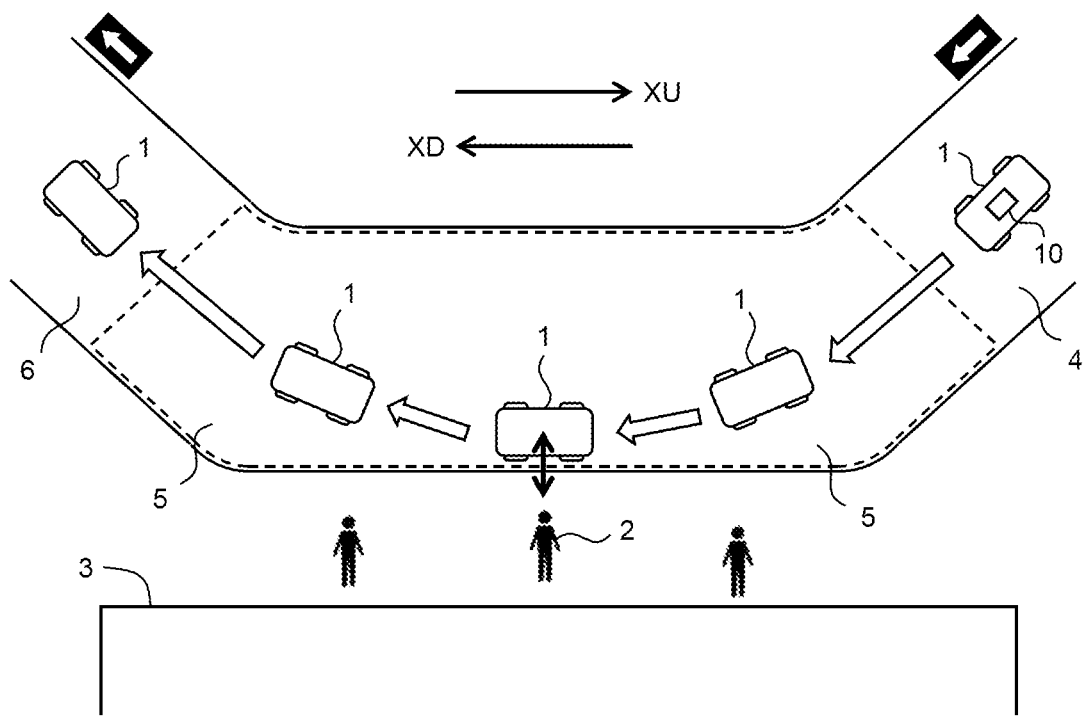
FIG. 1 is a conceptual diagram for explaining an outline of a driverless transportation service provided by an automated driving vehicle according to a first embodiment.

FIG. 1 is a conceptual diagram for explaining an outline of a driverless transportation service provided by an automated driving vehicle 1 according to a first embodiment. The automated driving vehicle 1 is capable of travelling autonomously without a driving operation by a driver. Examples of the automated driving vehicle 1 include a driverless taxi and a driverless bus. Such the automated driving vehicle 1 provides the driverless transportation service to a user 2.

More specifically, the automated driving vehicle 1 picks up a user 2 at a position specified by the user 2 or a predetermined position. Then, the automated driving vehicle 1 autonomously travels to a destination specified by the user 2 or a predetermined destination. When arriving at the destination, the automated driving vehicle 1 drops off the user 2. Picking up the user 2 by the automated driving vehicle 1 is hereinafter referred to as "pick-up." On the other hand, dropping off the user 2 by the automated driving vehicle 1 is hereinafter referred to as "drop-off." Boarding and alighting of the user 2 are sometimes collectively called "PUDO (Pick-Up/Drop-Off)."

In the present embodiment, a predetermined pick-up and drop-off area 5 provided in a facility 3 will be considered in particular. Examples of the facility 3 include a hotel, a building, a station, an airport, and the like. The pick-up and drop-off area 5 is a predetermined area (carriage porch) in which the automated driving vehicle 1 stops to pick up or drop off the user 2. When a destination of the user 2 is the facility 3, the automated driving vehicle 1 on which the user 2 rides stops in the pick-up and drop-off area 5 and drops off the user 2. On the other hand, when a departure place of the user 2 is the facility 3, the automated driving vehicle 1 stops in the pick-up and drop-off area 5, picks up the user 2, and departs for a destination.

The pick-up and drop-off area 5 is one-way. That is, a direction of travel of vehicles (all vehicles including the automated driving vehicle 1) in the pick-up and drop-off area 5 is predetermined. In terms of the direction of vehicle travel, "upstream" and "downstream" can be defined. That is, the direction of vehicle travel is a downstream direction XD (a first direction), and a direction opposite to the direction of vehicle travel is an upstream direction XU (a second direction). An approach road 4 provided upstream of the pick-up and drop-off area 5 is a road for guiding vehicles from a public road to the pick-up and drop-off area 5. On the other hand, an exit road 6 provided downstream of the pick-up and drop-off area 5 is a road for guiding vehicles from the pick-up and drop-off area 5 to a public road. The vehicles move in the downstream direction XD in an order of the approach road 4, the pick-up and drop-off area 5, and the exit road 6.

An automated driving system 10 controls the automated driving vehicle 1. Typically, the automated driving system 10 is installed on the automated driving vehicle 1. Alternatively, at least a part of the automated driving system 10 may be disposed outside the automated driving vehicle 1 and remotely control the automated driving vehicle 1.

The automated driving system 10 controls the automated driving vehicle 1 so as to enter the pick-up and drop-off area 5 from the approach road 4 and stop in the pick-up and drop-off area 5. When the automated driving vehicle 1 stops, the automated driving system 10 opens a door of the automated driving vehicle 1. The user 2 gets off the automated driving vehicle 1 or gets on the automated driving vehicle 1. Thereafter, the automated driving system 10 closes the door of the automated driving vehicle 1. Then, the automated driving system 10 makes the automated driving vehicle 1 start moving and travel from the pick-up and drop-off area 5 to the exit road 6.

1-2. Determination of Stop Position in Pick-Up and Drop-Off Area

Next, a method of determining a stop position when making the automated driving vehicle 1 stop in the pick-up and drop-off area 5 will be described.

First, a "stop lot S" will be described. The stop lot (stop frame) S is a lot (frame) that defines a space in which a single automated driving vehicle 1 stops. It should be noted here that the stop lot S is a virtual one and does not need to be actually defined by a marking line. The stop lot S is so set as to include a margin (inter-vehicle distance) necessary for making a stop. Therefore, the stop lot S is larger than a size of the automated driving vehicle 1 to some extent. A plurality of stop lots S are virtually arranged (arrayed) in the pick-up and drop-off area 5. In order to efficiently utilize the pick-up and drop-off area 5, a distance between adjacent stop lots S is preferably set to be sufficiently small.

Figure 2:
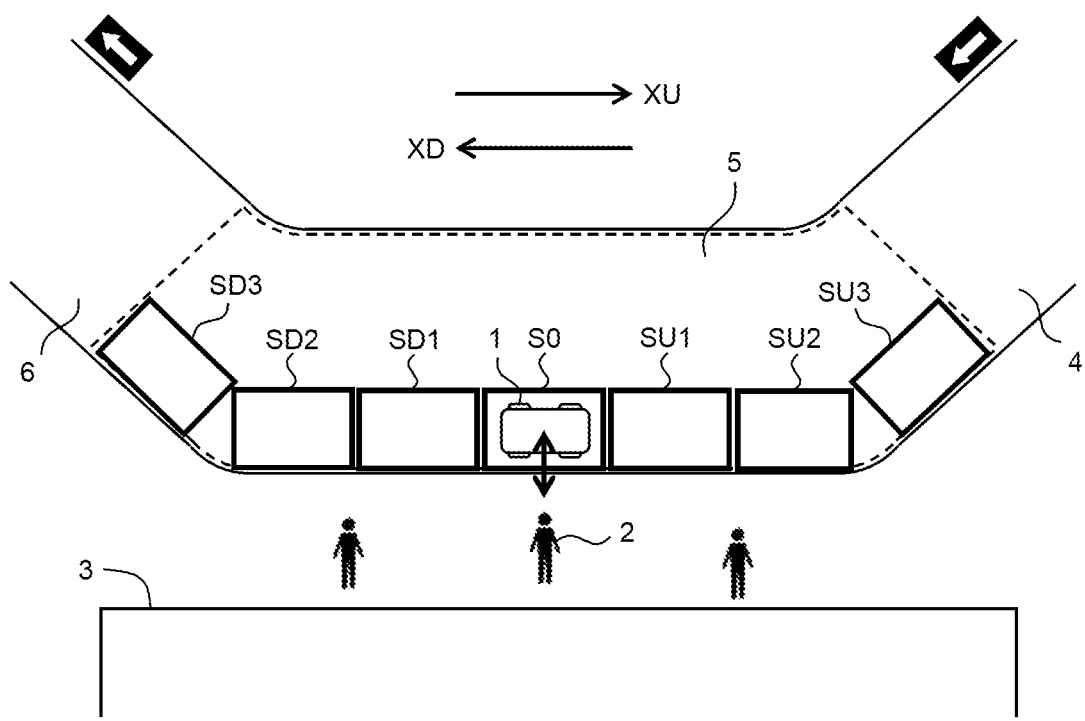
FIG. 2 is a conceptual diagram for explaining an example of a plurality of stop lots in a pick-up and drop-off area according to the first embodiment.

FIG. 2 is a conceptual diagram for explaining an example of the plurality of stop lots S in the pick-up and drop-off area 5. The plurality of stop lots S include a standard stop lot S0, an upstream stop lot SU, and a downstream stop lot SD.

The standard stop lot S0 is a default stop lot S that is predetermined or a stop lot S specified by the user 2. Typically, a stop lot S with high convenience is set as the default standard stop lot S0. For example, the default standard stop lot S0 is set to a position facing an entrance of the facility 3. Position information of the default standard stop lot S0 is registered in advance in map information or provided from the facility 3 to the automated driving system 10. When the standard stop lot S0 is specified by the user 2, position information of the specified standard stop lot S0 is provided from a user terminal of the user 2 to the automated driving system 10.

The upstream stop lot SU is the stop lot S located in the upstream direction XU when viewed from the standard stop lot S0. In the example shown in FIG. 2, three upstream stop lots SU1 to SU3 are arranged in order from the side of the standard stop lot S0. On the other hand, the downstream stop lot SD is the stop lot S located in the downstream direction XD when viewed from the standard stop lot S0. In the example shown in FIG. 2, three downstream stop lots SD1 to SD3 are arranged in order from the side of the standard stop lot S0. It should be noted that the numbers of the upstream stop lots SU and the downstream stop lots SD are arbitrary.

The automated driving system 10 has a function of recognizing a situation around the automated driving vehicle 1 by the use of a sensor installed on the automated driving vehicle 1. By using the recognition function, the automated driving system 10 searches for an available (vacant) stop lot S among the plurality of stop lots S. According to the present embodiment, an "order of priority" is set with respect to the plurality of stop lots S in order to improve a search efficiency.

Figure 3:
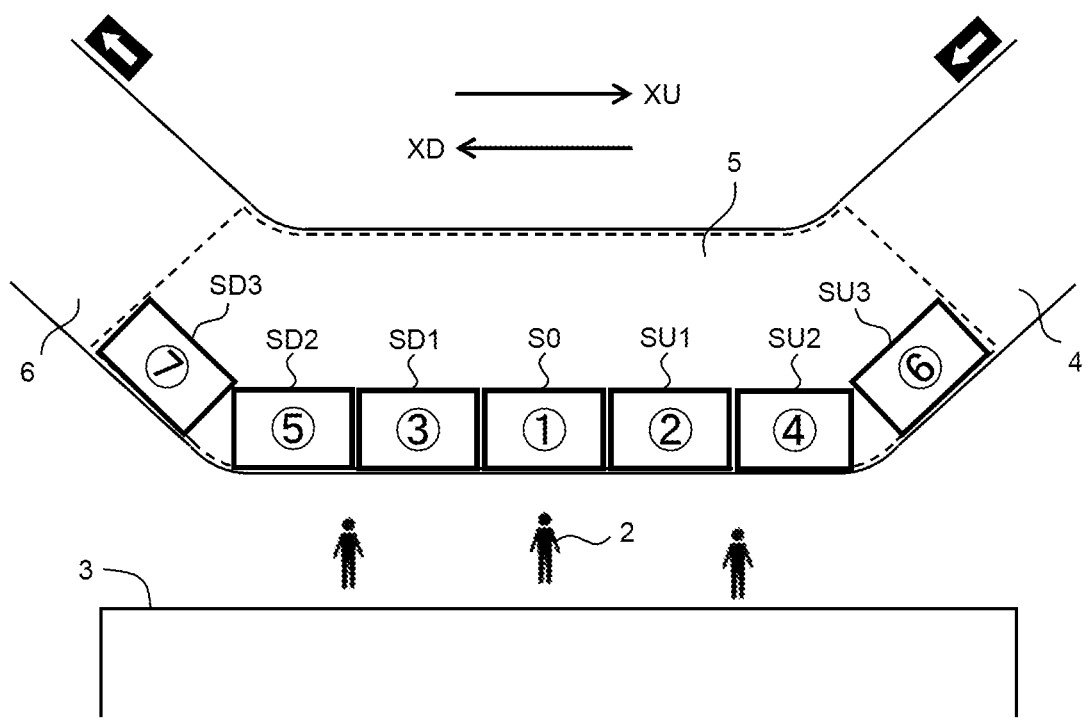
FIG. 3 is a conceptual diagram for explaining an example of an order of priority of the plurality of stop lots according to the first embodiment.

FIG. 3 is a conceptual diagram for explaining an example of the order of priority of the plurality of stop lots S illustrated in FIG. 2. A circled number in each stop lot S represents the order of priority (1 is the highest). In the example shown in FIG. 3, the standard stop lot S0 has the highest order of priority. As to the other stop lots S, a stop lot S closer to the standard stop lot S0 has a higher order of priority. In the example shown in FIG. 3, the order of priority is higher in an order of S0, SU1, SD1, SU2, SD2, SU3, and SD3.

The automated driving system 10 selects a stop lot S one by one in the order of priority. The stop lot S selected is hereinafter referred to as a "selected stop lot SS." The automated driving system 10 determines whether or not the automated driving vehicle 1 can be stopped in the selected stop lot SS, that is, whether or not the selected stop lot SS is available (vacant). For example, if another vehicle is already stopped in the selected stop lot SS, the selected stop lot SS is not available. When the selected stop lot SS is not available, the automated driving system 10 selects a stop lot S of the next order of priority and executes the determination process again. When the selected stop lot SS is available, the automated driving system 10 sets the selected stop lot SS as a target stop lot ST. Then, the automated driving system 10 controls the automated driving vehicle 1 such that the automated driving vehicle 1 travels toward the target stop lot ST and stops in the target stop lot ST.

According to the present embodiment, there is no need to haphazardly search the pick-up and drop-off area 5 for an available (vacant) space in which the automated driving vehicle 1 can be stopped. The reason is that the plurality of stop lots S are virtually arranged in the pick-up and drop-off area 5 and further the order of priority of the plurality of stop lots S is set. The automated driving system 10 can select a stop lot S one by one in the order of priority and determine whether or not the selected stop lot SS is available. When the selected stop lot SS is available, the selected stop lot SS is set as the target stop lot ST. Such the method makes it possible to efficiently determine the stop position (i.e., the target stop lot ST) in the pick-up and drop-off area 5. Since the stop position can be efficiently determined, a computational load imposed on the automated driving system 10 is reduced. Moreover, a time required for the automated driving vehicle 1 to make a stop also is reduced.

Moreover, when the order of priority is appropriately set, the target stop lot ST also is appropriately determined resultantly. For instance, in the example shown in FIG. 3, the standard stop lot S0 has the highest order of priority, and the stop lot S closer to the standard stop lot S0 has a higher order of priority. The standard stop lot S0 is the stop lot S with high convenience or the stop lot S specified by the user 2. Therefore, such the setting that the stop lot S closer to the standard stop lot S0 has a higher order of priority is preferable from a viewpoint of convenience for the user 2 or the request from the user 2.

1-3. Configuration Example of Automated Driving System

Figure 4:
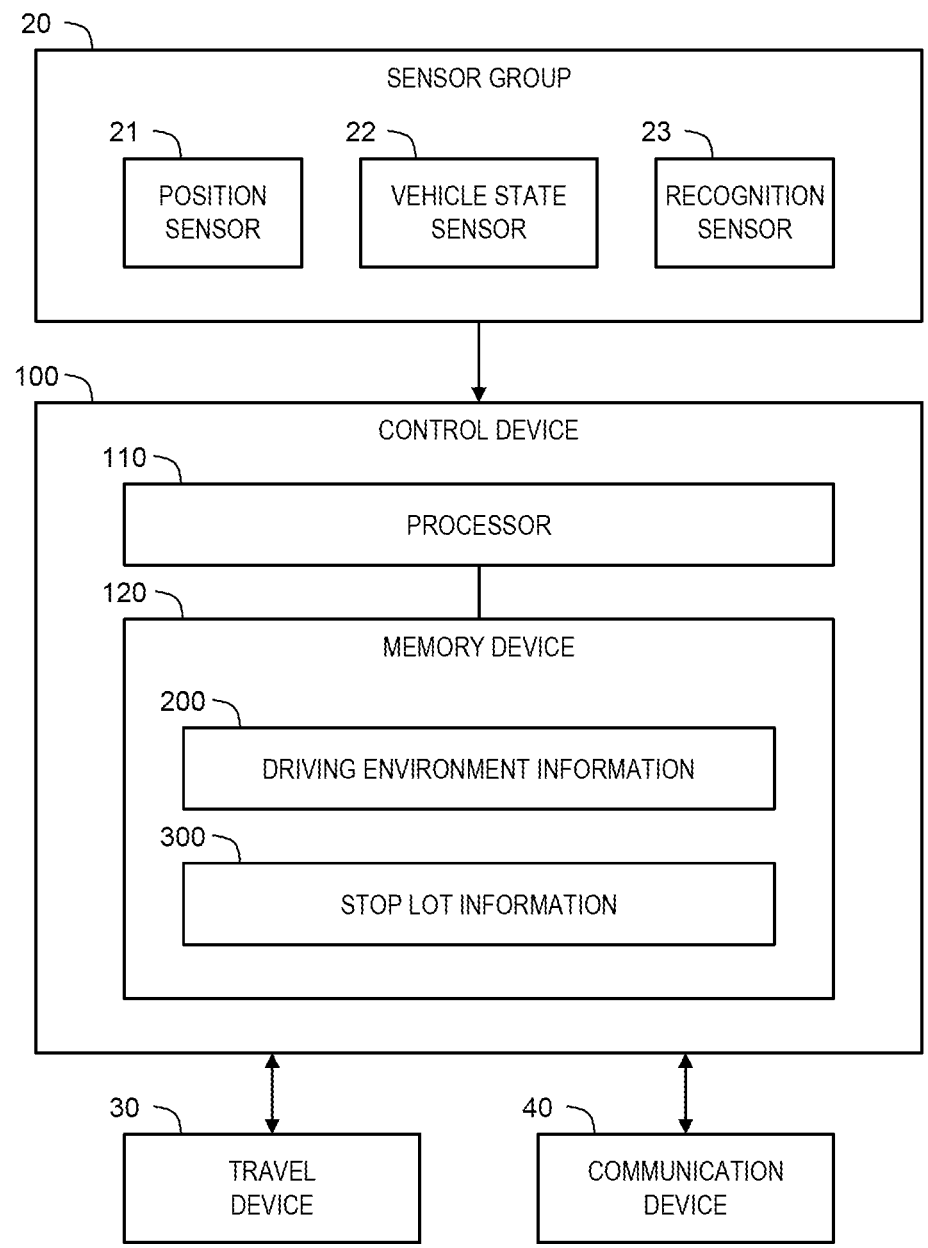
FIG. 4 is a block diagram showing a configuration example of an automated driving system according to the first embodiment.

FIG. 4 is a block diagram showing a configuration example of the automated driving system 10 according to the present embodiment. The automated driving system 10 includes a sensor group 20, a travel device 30, a communication device 40, and a control device (controller) 100.

The sensor group 20 is installed on the automated driving vehicle 1. The sensor group 20 includes a position sensor 21, a vehicle state sensor 22, and a recognition sensor 23. The position sensor 21 detects a position and an orientation of the automated driving vehicle 1. As the position sensor 21, a GPS (Global Positioning System) sensor is exemplified. The vehicle state sensor 22 detects a state of the automated driving vehicle 1. Examples of the vehicle state sensor 22 include a vehicle speed sensor, a yaw rate sensor, a lateral acceleration sensor, a steering angle sensor, and the like. The recognition sensor 23 recognizes (detects) a situation around the automated driving vehicle 1. Examples of the recognition sensor 23 include a camera, a radar, a LIDAR (Laser Imaging Detection and Ranging), and the like.

The travel device 30 is installed on the automated driving vehicle 1. The travel device 30 includes a steering device, a driving device, and a braking device. The steering device turns wheels of the automated driving vehicle 1. For example, the steering device includes an electric power steering (EPS) device. The driving device is a power source that generates a driving force. Examples of the drive device include an engine, an electric motor, an in-wheel motor, and the like. The braking device generates a braking force.

The communication device 40 communicates with the outside of the automated driving system 10. For example, the communication device 40 communicates with a management server that manages the driverless transportation service. As another example, the communication device 40 communicates with a user terminal (for example, a smartphone, a tablet, or a personal computer) owned by the user 2.

The control device (controller) 100 controls the automated driving vehicle 1. Typically, the control device 100 is a microcomputer installed on the automated driving vehicle 1. The control device 100 is also called an electronic control unit (ECU). Alternatively, the control device 100 may be an information processing device outside the automated driving vehicle 1. In this case, the control device 100 communicates with the automated driving vehicle 1 and remotely controls the automated driving vehicle 1.

The control device 100 includes a processor 110 and a memory device 120. The processor 110 executes a variety of processing. The memory device 120 stores a variety of information. Examples of the memory device 120 include a volatile memory, a nonvolatile memory, and the like. The variety of processing by the processor 110 (the control device 100) is achieved by the processor 110 executing a control program being a computer program. The control program is stored in the memory device 120 or recorded in a computer-readable recording medium.

The processor 110 executes vehicle travel control that controls travel of the automated driving vehicle 1. The vehicle travel control includes steering control, acceleration control, and deceleration control. The processor 110 executes the vehicle travel control by controlling the travel device 30. More specifically, the processor 110 executes the steering control by controlling the steering device. The processor 110 executes the acceleration control by controlling the driving device. The control device 100 executes the deceleration control by controlling the braking device.

Moreover, the processor 110 acquires driving environment information 200 indicating a driving environment for the automated driving vehicle 1. The driving environment information 200 is acquired based on a result of detection by the sensor group 20 installed on the automated driving vehicle 1. The acquired driving environment information 200 is stored in the memory device 120.

Figure 5:
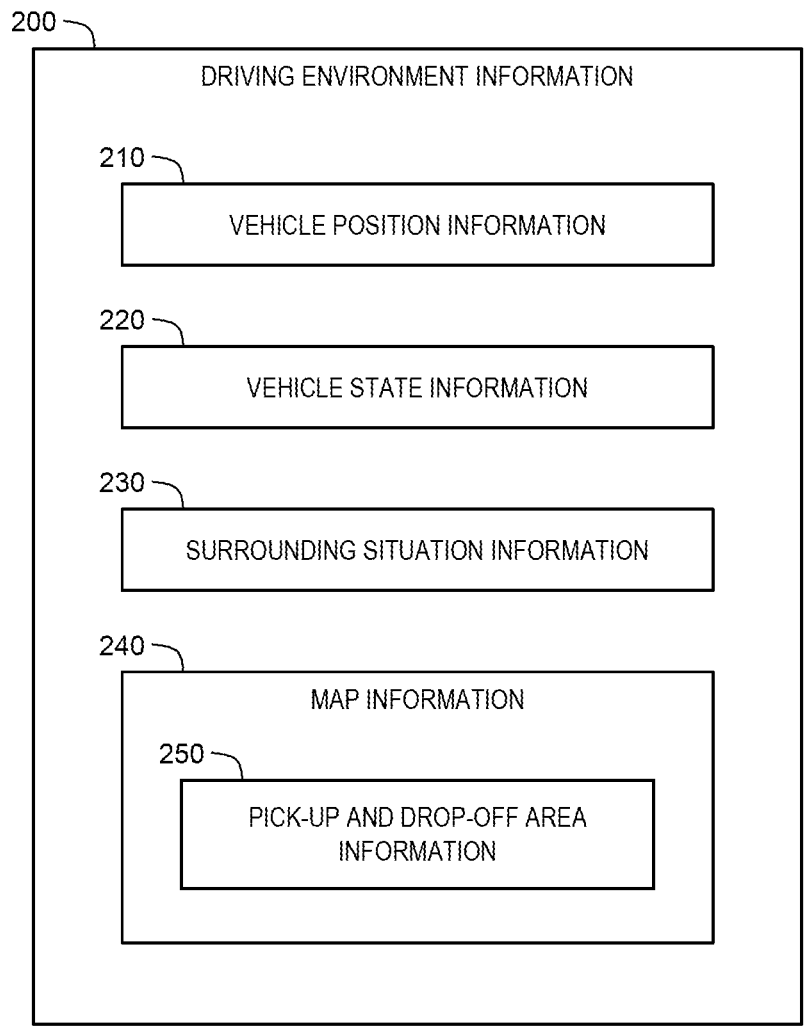
FIG. 5 is a block diagram showing an example of driving environment information in the first embodiment.

FIG. 5 is a block diagram showing an example of the driving environment information 200. The driving environment information 200 includes vehicle position information 210, vehicle state information 220, surrounding situation information 230, and map information 240.

The vehicle position information 210 is information indicating the position and the orientation of the automated driving vehicle 1 in the absolute coordinate system. The processor 110 acquires the vehicle position information 210 from a result of detection by the position sensor 21. In addition, the processor 110 may acquire more accurate vehicle position information 210 by performing a well-known localization.

The vehicle state information 220 is information indicating the state of the automated driving vehicle 1. Examples of the state of the automated driving vehicle 1 include a vehicle speed, a yaw rate, a lateral acceleration, a steering angle, and the like. The processor 110 acquires the vehicle state information 220 from a result of detection by the vehicle state sensor 22.

The surrounding situation information 230 is information indicating a situation around the automated driving vehicle 1. The surrounding situation information 230 includes information acquired by the recognition sensor 23. For example, the surrounding situation information 230 includes image information indicating a situation around the automated driving vehicle 1 imaged by the camera. As another example, the surrounding situation information 230 includes measurement information measured by the radar or the LIDAR. Further, the surrounding situation information 230 includes object information regarding an object around the automated driving vehicle 1. Examples of the object around the automated driving vehicle 1 include another vehicle, a pedestrian, a sign, a white line, a roadside structure (e.g., a guardrail, a curb), and the like. The object information indicates a relative position of the object with respect to the automated driving vehicle 1. For example, analyzing the image information obtained by the camera makes it possible to identify the object and calculate the relative position of the object. It is also possible to identify the object and acquires the relative position of the object based on the radar measurement information.

The map information 240 indicates a lane configuration, a road shape, and the like. The map information 240 includes a general navigation map. The processor 110 acquires the map information 240 of a necessary area from a map database. The map database may be stored in a predetermined storage device installed on the automated driving vehicle 1, or may be stored in a management server outside the automated driving vehicle 1. In the latter case, the processor 110 communicates with the management server via the communication device 40 to acquire the necessary map information 240.

The pick-up and drop-off area information 250 indicates a position and a range of the pick-up and drop-off area 5 provided in the facility 3. For example, the pick-up and drop-off area information 250 is registered in advance in the map information 240. As another example, the pick-up and drop-off area information 250 may be provided from the facility 3 when the automated driving vehicle 1 comes close to the facility 3. In this case, the processor 110 communicates with the facility 3 via the communication device 40 to acquire the pick-up and drop-off area information 250 related to the facility 3. It should be noted that the position and the range of the pick-up and drop-off area 5 are clearly defined on the map although the actual pick-up and drop-off area 5 may not be clear.

Furthermore, the processor 110 acquires stop lot information 300 (see FIG. 4). The stop lot information 300 indicates the positions (the arrangement) of the plurality of stop lots S in the pick-up and drop-off area 5. Furthermore, the stop lot information 300 indicates the order of priority of the plurality of stop lots S. A method of acquiring the stop lot information 300 will be described later. The acquired stop lot information 300 is stored in the memory device 120.

It should be noted that using the vehicle position information 210 makes it possible to convert absolute positions of the pick-up and drop-off area 5 and the stop lot S into relative positions with respect to the automated driving vehicle 1, and vice versa. In the following description, the position of the pick-up and drop-off area 5 or the stop lot S means an appropriate one of the absolute position and the relative position.

Hereinafter, processing by the automated driving system 10 (the processor 110) in the pick-up and drop-off area 5 according to the present embodiment will be described.

1-4. Processing in Pick-Up and Drop-Off Area

Figure 6:
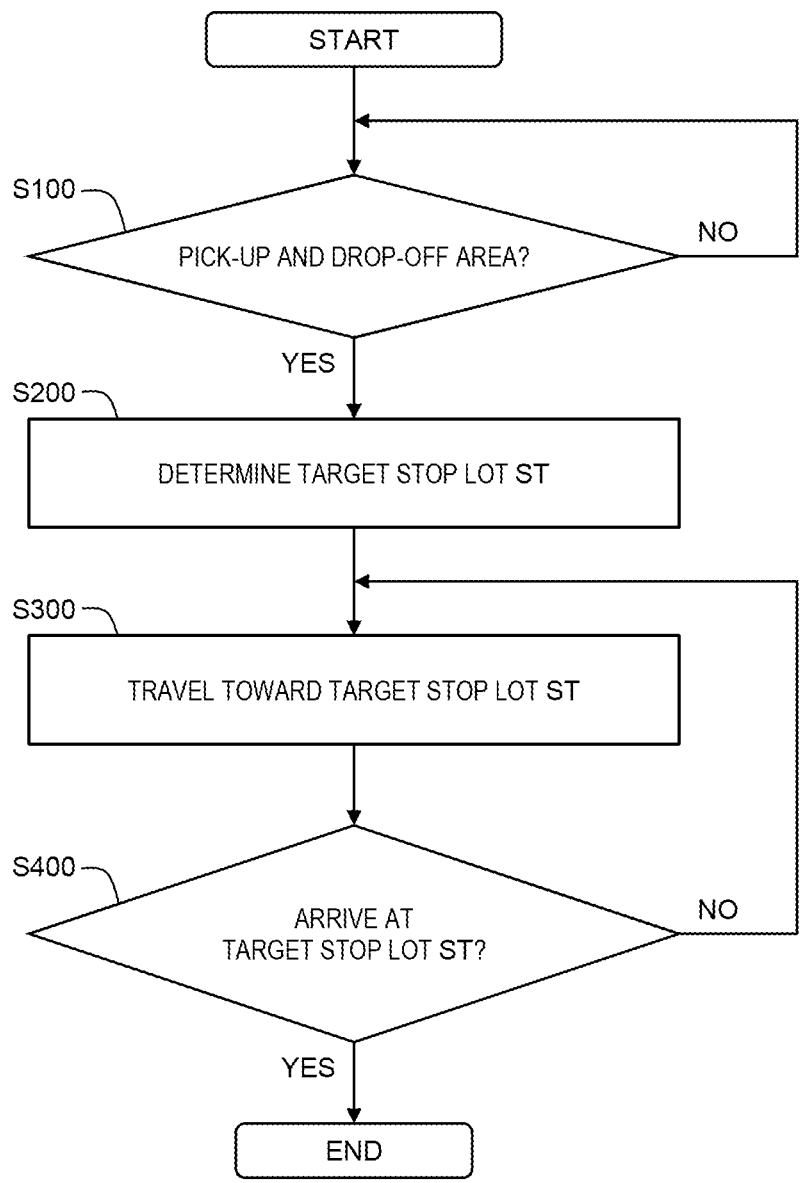
FIG. 6 is a flow chart showing processing by the automated driving system in the pick-up and drop-off area according to the first embodiment.

FIG. 6 is a flow chart showing processing by the automated driving system 10 (the processor 110) in the pick-up and drop-off area 5 according to the present embodiment. It should be noted that the above-described driving environment information 200 is updated at a predetermined cycle in another process flow.

In Step S100, the processor 110 determines whether or not the automated driving vehicle 1 has entered the pick-up and drop-off area 5. The position of the automated driving vehicle 1 is obtained from the vehicle position information 210. The position and the range of the pick-up and drop-off area 5 are obtained from the pick-up and drop-off area information 250. Therefore, the processor 110 can determine whether or not the automated driving vehicle 1 has entered the pick-up and drop-off area 5 based on the vehicle position information 210 and the pick-up and drop-off area information 250. When the automated driving vehicle 1 enters the pick-up and drop-off area 5 (Step S100; Yes), the processing proceeds to Step S200.

As a modification example of Step S100, the processor 110 may determine whether or not the automated driving vehicle 1 has reached a position a certain distance before the pick-up and drop-off area 5. When the automated driving vehicle 1 has reached the position a certain distance before the pick-up and drop-off area 5 (Step S100; Yes), the processing proceeds to Step S200.

In Step S200, the processor 110 determines the target stop lot ST in the pick-up and drop-off area 5. The surrounding situation information 230 indicates the situation around the automated driving vehicle 1. In particular, the surrounding situation information 230 includes the object information regarding the object (e.g., another vehicle 7 and the like) around the automated driving vehicle 1. Therefore, the processor 110 can determine an available target stop lot ST based on the surrounding situation information 230. Details of this Step S200 will be described later.

In Step S300, the processor 110 performs the vehicle travel control such that the automated driving vehicle 1 travels toward the target stop lot ST and stops in the target stop lot ST. The vehicle travel control is performed based on the driving environment information 200. Since a technique for controlling the vehicle to reach a target position is well known, a detailed description thereof will be omitted.

Step S300 is repeated until the automated driving vehicle 1 arrives at the target stop lot ST. When the automated driving vehicle 1 arrives at the target stop lot ST (Step S400; Yes), the process flow shown in FIG. 6 ends. The user 2 gets off the automated driving vehicle 1 or gets on the automated driving vehicle 1.

Figure 7:
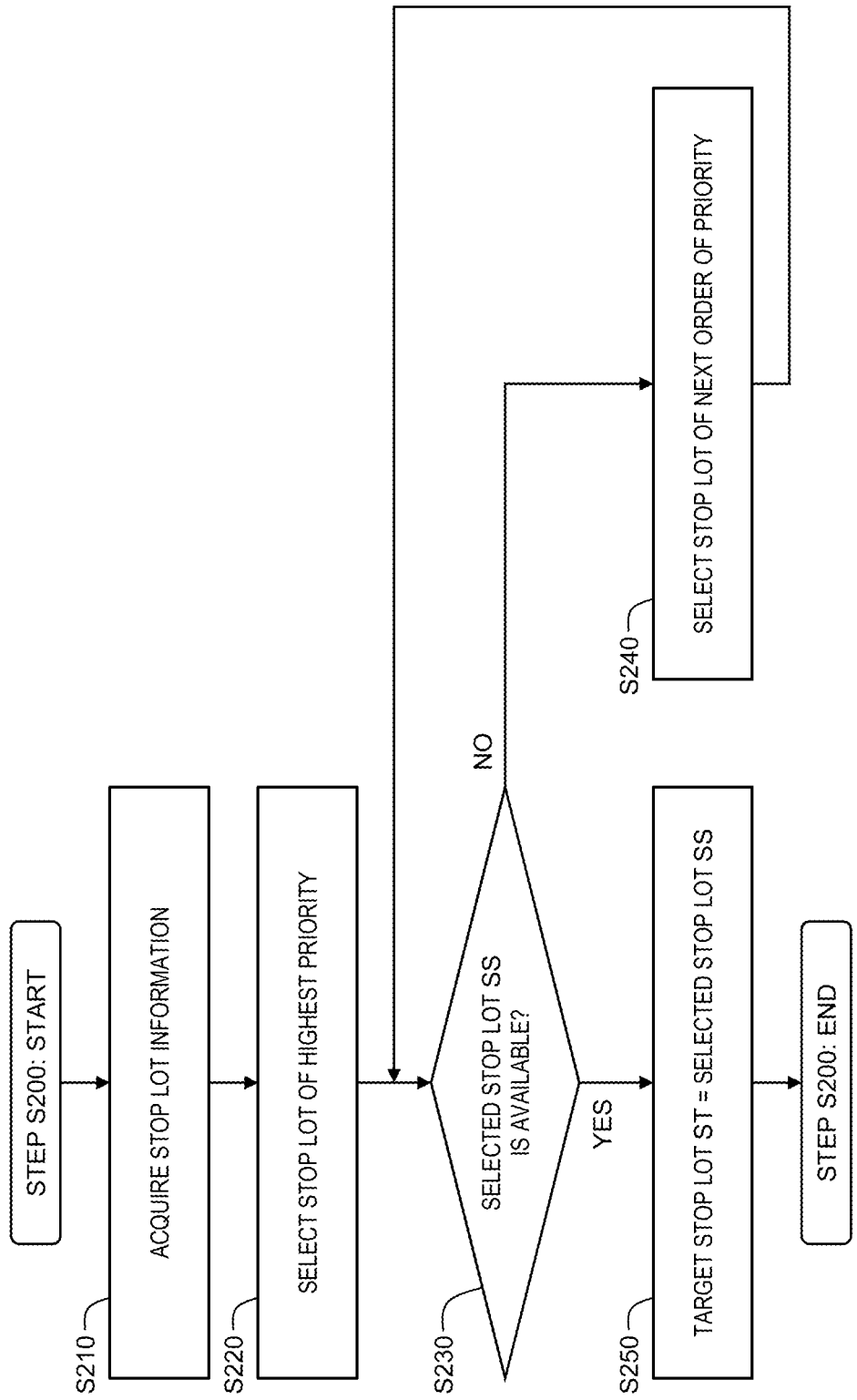
FIG. 7 is a flow chart showing processing in Step S200 in FIG. 6.

FIG. 7 is a flow chart showing Step S200 (the determination of the target stop lot ST).

In Step S210, the processor 110 acquires the stop lot information 300. The stop lot information 300 indicates the positions (the arrangement) and the order of priority of the plurality of stop lots S in the pick-up and drop-off area 5.

For example, the positions of the plurality of stop lots S are predetermined. Moreover, the order of priority of the plurality of stop lots S also is predetermined. Such the default stop lot information 300 is included in the pick-up and drop-off area information 250. The processor 110 acquires the default stop lot information 300 from the pick-up and drop-off area information 250.

As another example, the standard stop lot S0 may be specified by the user 2. In this case, the user 2 specifies a desired stop position in the map by the use of the user terminal. The processor 110 communicates with the user terminal of the user 2 via the communication device 40 and acquires information indicating the position of the specified stop position. Then, the processor 110 sets a stop lot S including the specified stop position as a new standard stop lot S0. Furthermore, based on the new standard stop lot S0, the processor 110 updates the order of priority of the plurality of stop lots S from the default settings. For example, as shown in FIG. 3, the order of priority of a stop lot S closer to the new standard stop lot S0 is set to be higher. In this manner, the processor 110 is able to acquire the stop lot information 300 in which the user 2's request is reflected.

In Step S220, the processor 110 selects a stop lot S of the highest order of priority among the plurality of stop lots S based on the stop lot information 300. The stop lot S selected is the selected stop lot SS. After that, the processing proceeds to Step S230.

In Step S230, the processor 110 executes a "determination process" that determines whether or not the selected stop lot SS is available for the automated driving vehicle 1 to stop. The position of the selected stop lot SS is obtained from the stop lot information 300. Whether or not another vehicle is stopped in the selected stop lot SS can be determined based on the surrounding situation information 230. Therefore, the processor 110 can determine whether or not the selected stop lot SS is available for the automated driving vehicle 1 to stop based on the stop lot information 300 and the surrounding situation information 230.

When the selected stop lot SS is not available for the automated driving vehicle 1 to stop (Step S230; No), the processing proceeds to Step S240. In Step S240, the processor 110 selects a stop lot S of the next highest order of priority as the selected stop lot SS. Then, the processing returns back to Step S230 (the determination process).

When the selected stop lot SS is available for the automated driving vehicle 1 to stop (Step S230; Yes), the processing proceeds to Step S250. In Step S250, the processor 110 sets the selected stop lot SS as the target stop lot ST.

1-5. Effects

According to the present embodiment, as described above, the plurality of stop lots S are virtually arranged in the pick-up and drop-off area 5 and further the order of priority of the plurality of stop lots S is set. The automated driving system 10 selects a stop lot S one by one in the order of priority and determines whether or not the selected stop lot SS is available. When the selected stop lot SS is available, the selected stop lot SS is set as the target stop lot ST.

As a comparative example, a case where the stop lot S is not set in the pick-up and drop-off area 5 is considered. In the case of the comparative example, it is necessary to haphazardly search the pick-up and drop-off area 5 for an available (vacant) space in which the automated driving vehicle 1 can be stopped. Such the method of searching is inefficient. The inefficient method of searching causes increase in computational load, increase in a time required for the automated driving vehicle 1 to make a stop, and the like.

On the other hand, according to the present embodiment, there is no need to haphazardly search the pick-up and drop-off area 5 for an available (vacant) space in which the automated driving vehicle 1 can be stopped. The automated driving system 10 can select a stop lot S one by one in the order of priority and determine whether or not the selected stop lot SS is available. Such the method makes it possible to efficiently determine the stop position (i.e., the target stop lot ST) in the pick-up and drop-off area 5. Since the stop position can be efficiently determined, the computational load imposed on the automated driving system 10 is reduced. Moreover, the time required for the automated driving vehicle 1 to make a stop also is reduced.

Moreover, when the order of priority is appropriately set, the target stop lot ST also is appropriately determined resultantly. For instance, in the example shown in FIG. 3, the standard stop lot S0 has the highest order of priority, and the stop lot S closer to the standard stop lot S0 has a higher order of priority. The standard stop lot S0 is the stop lot S with high convenience or the stop lot S specified by the user 2. Therefore, such the setting that the stop lot S closer to the standard stop lot S0 has a higher order of priority is preferable from a viewpoint of convenience for the user 2 or the request from the user 2.

Moreover, in the case of the comparative example where the stop lot S is not set, a plurality of vehicles including the automated driving vehicle 1 are chaotically stopped in a random pattern. This is not preferable from a viewpoint of an efficient use of the limited pick-up and drop-off area 5.

On the other hand, according to the present embodiment, the stop lot S is set in the pick-up and drop-off area 5, and the automated driving vehicle 1 is stopped in the stop lot S. A plurality of automated driving vehicles 1 do not stop randomly but stop methodically in the pick-up and drop-off area 5. As a result, it is possible to efficiently use the limited pick-up and drop-off area 5. Even if not only the automated driving vehicle 1 but also another vehicle exists, when the automated driving vehicle 1 is stopped in the stop lot S, it is expected that another vehicle also aligns originating from the stopped automated driving vehicle 1. Therefore, the effect of the efficient use of the limited pick-up and drop-off area 5 can be obtained to some extent.

Furthermore, when the stop lot S is appropriately set, inappropriate stopping state is prevented resultantly. For example, when a pedestrian crossing exists in the pick-up and drop-off area 5, the stop lots S are set so as not to overlap the pedestrian crossing. As a result, it is prevented that the automated driving vehicle 1 is stopped on the pedestrian crossing.

2. Second Embodiment

According to a second embodiment, the processor 110 switches a setting of the order of priority of the plurality of stop lots S according to whether the automated driving vehicle 1 drops off or picks up the user 2. Hereinafter, each case of the drop-off and the pick-up will be described. An overlapping description with the first embodiment will be omitted as appropriate.

2-1. Drop-Off

Figure 8:
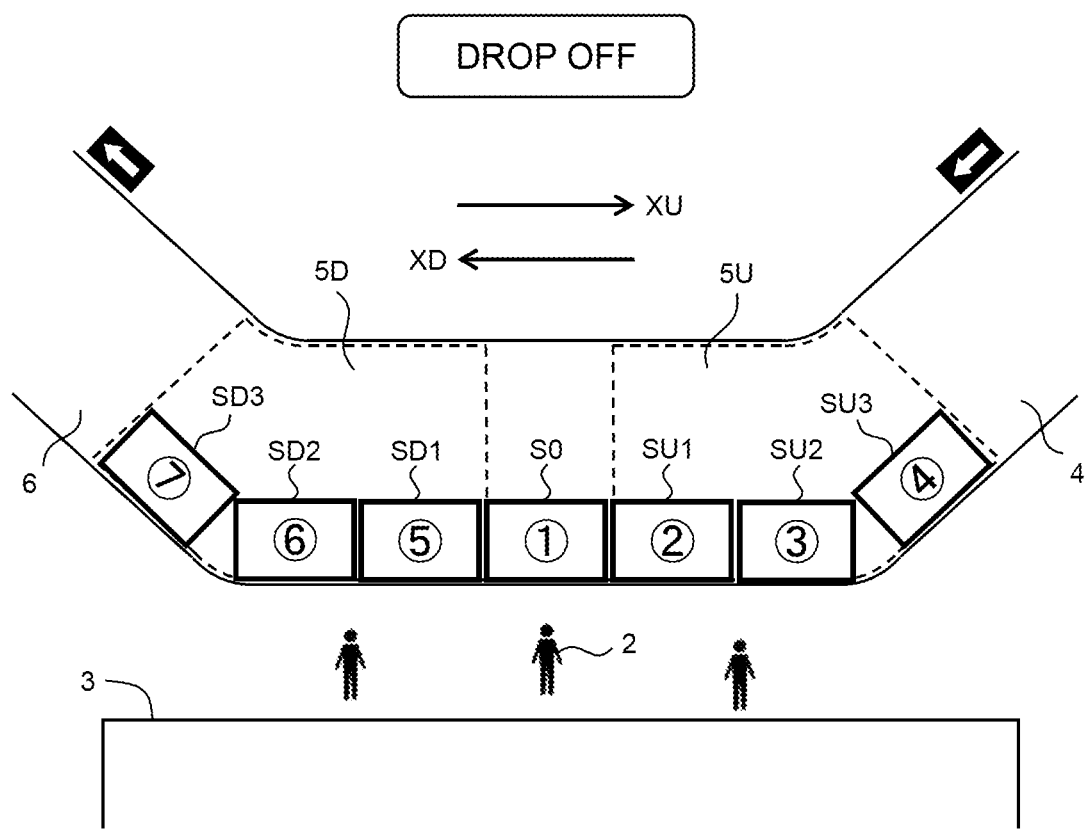
FIG. 8 is a conceptual diagram for explaining an example of the order of priority of the plurality of stop lots in a case of drop-off according to a second embodiment.

FIG. 8 is a conceptual diagram for explaining an example of the order of priority of the plurality of stop lots S in the case of the drop-off according to the second embodiment. The pick-up and drop-off area 5 includes an upstream area 5U and a downstream area 5D. The upstream area 5U is the pick-up and drop-off area 5 existing in the upstream direction XU from the standard stop lot S0. On the other hand, the downstream area 5D is the pick-up and drop-off area 5 existing in the downstream direction XD from the standard stop lot S0.

When the standard stop lot S0 is not available at the time of the drop-off, the upstream area 5U is preferentially used. For that purpose, the order of priority of the upstream stop lot SU is set to be higher than the order of priority of the downstream stop lot SD. In the example shown in FIG. 8, the order of priority is higher in an order of S0, SU1, SU2, SU3, SD1, SD2, and SD3.

Figure 9:
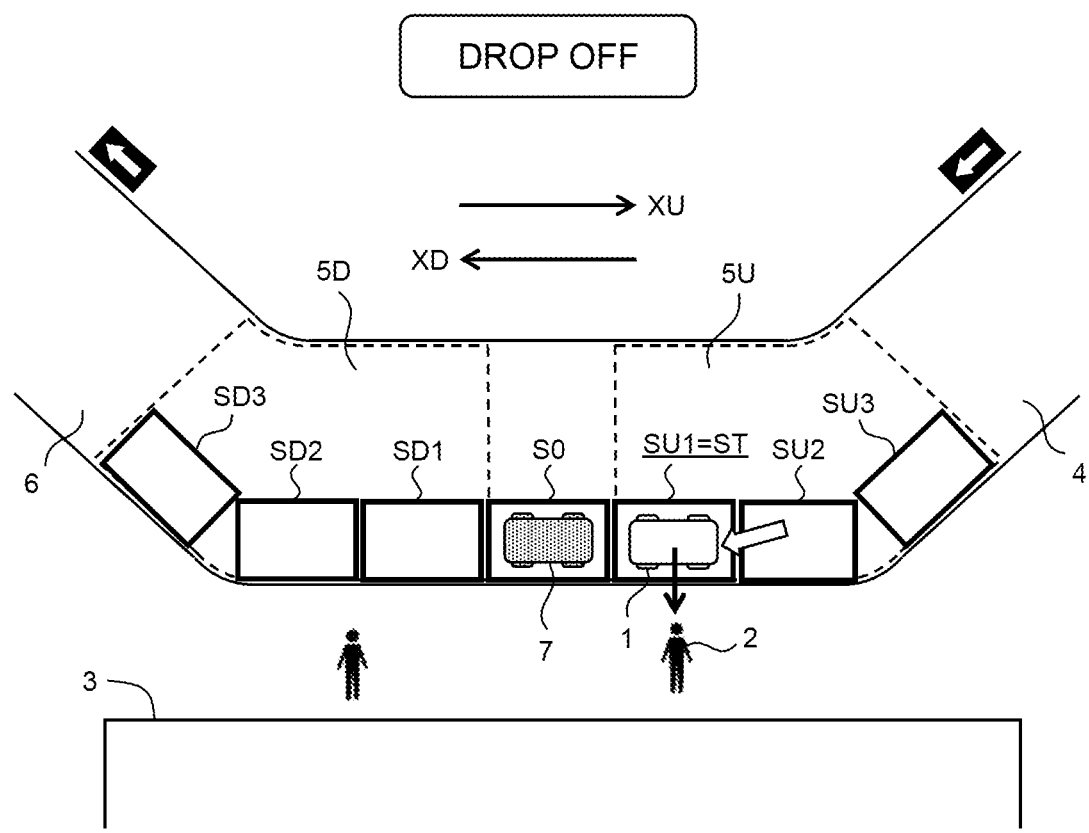
FIG. 9 is a conceptual diagram for explaining an example of the drop-off according to the second embodiment.

FIG. 9 is a conceptual diagram for explaining an effect in the case of the drop-off. Since another vehicle 7 is stopped in the standard stop lot S0, the standard stop lot S0 is not available. The upstream stop lot SU1 having the next highest order of priority is available. Therefore, the upstream stop lot SU1 is set as the target stop lot ST. The processor 110 controls the automated driving vehicle 1 so as to stop in the upstream stop lot SU1. After the automated driving vehicle 1 stops, the user 2 gets off the automated driving vehicle 1.

The automated driving vehicle 1 gets to the upstream area 5U earlier than to the downstream area 5D. Therefore, making the automated driving vehicle 1 stop not in the downstream area 5D but in the upstream area 5U enables the user 2 to more quickly get off the automated driving vehicle 1. As a result, the user 2 becomes free more quickly and is able to use time efficiently. That is, convenience and time efficiency are improved from a viewpoint of the user 2.

After the user 2 gets off, the processor 110 makes the automated driving vehicle 1 start moving. At this time, another vehicle 7 may still be stopped in the standard stop lot S0 existing ahead of the automated driving vehicle 1. The other vehicle 7 may hinder the automated driving vehicle 1 from starting. However, since the user 2 has already got off, the user 2 does not feel stress even if the start of the automated driving vehicle 1 is somewhat delayed.

2-2. Pick-Up

Figure 10:
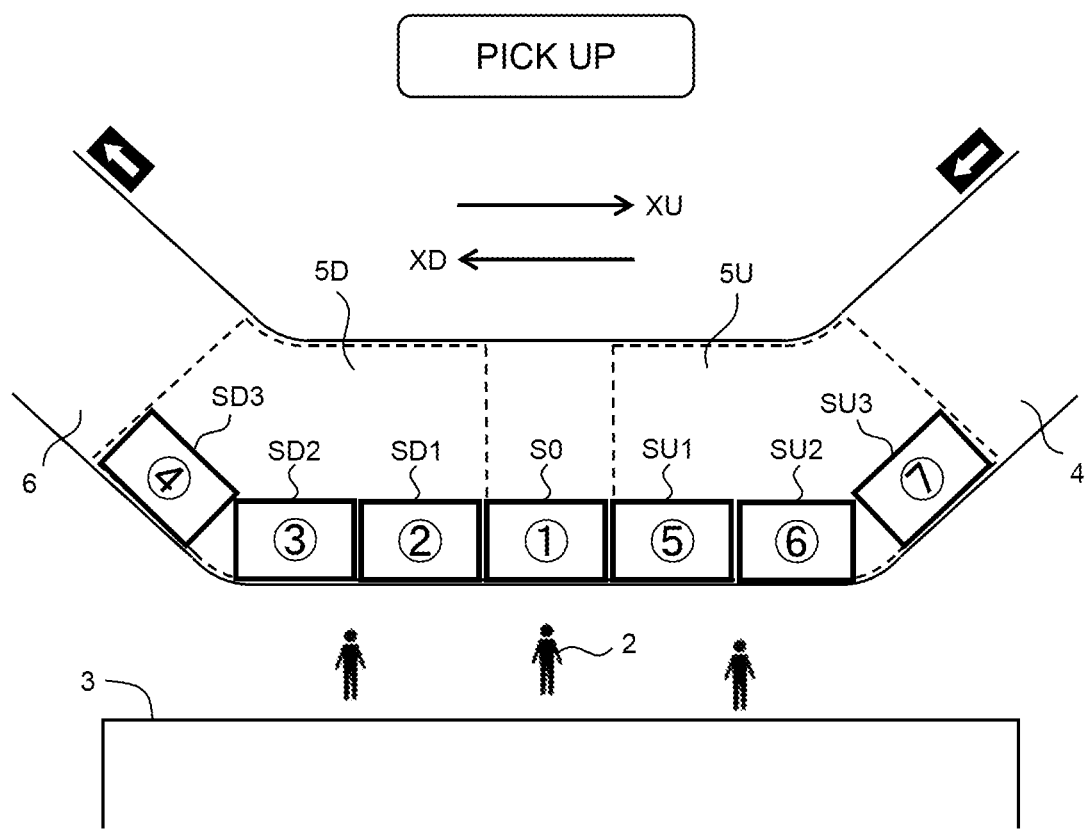
FIG. 10 is a conceptual diagram for explaining an example of the order of priority of the plurality of stop lots in a case of pick-up according to the second embodiment.

FIG. 10 is a conceptual diagram for explaining an example of the order of priority of the plurality of stop lots S in the case of the pick-up according to the second embodiment. When the standard stop lot S0 is not available at the time of the pick-up, the downstream area 5D is preferentially used. For that purpose, the order of priority of the downstream stop lot SD is set to be higher than the order of priority of the upstream stop lot SU. In the example shown in FIG. 10, the order of priority is higher in an order of S0, SD1, SD2, SD3, SU1, SU2, and SU3.

Figure 11:
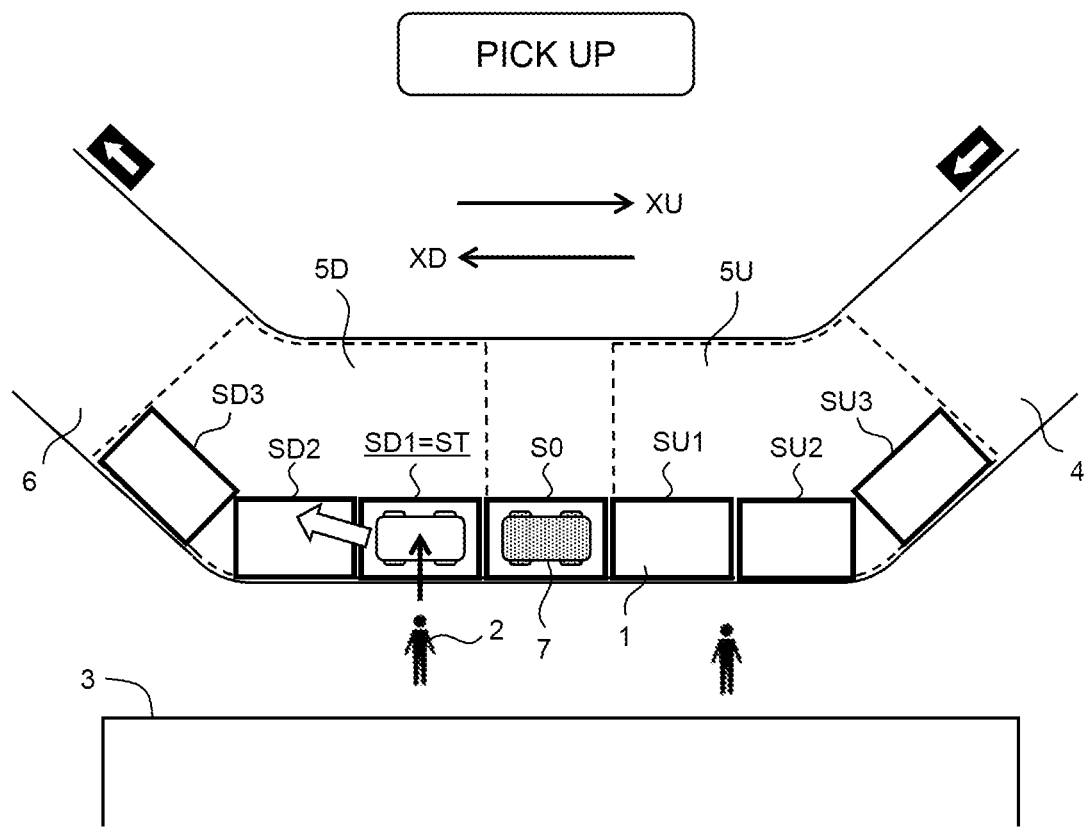
FIG. 11 is a conceptual diagram for explaining an example of the pick-up according to the second embodiment.

FIG. 11 is a conceptual diagram for explaining an effect in the case of the pick-up. Since another vehicle 7 is stopped in the standard stop lot S0, the standard stop lot S0 is not available. The downstream stop lot SD1 having the next highest order of priority is available. Therefore, the downstream stop lot SD1 is set as the target stop lot ST. The processor 110 controls the automated driving vehicle 1 so as to stop in the downstream stop lot SD1. When the automated driving vehicle 1 stops, the user 2 gets on the automated driving vehicle 1. The automated driving vehicle 1 may wait at the target stop lot ST until the user 2 arrives. After the user 2 gets on the automated driving vehicle 1, the processor 110 makes the automated driving vehicle 1 start moving and travel toward a next destination.

The automated driving vehicle 1 stopped in the downstream area 5D is able to exit the pick-up and drop-off area 5 earlier than when the automated driving vehicle 1 is stopped in the upstream area 5U. Therefore, making the automated driving vehicle 1 stop not in the upstream area 5U but in the downstream area 5D enables the automated driving vehicle 1 with the user 2 to more quickly depart for the destination. That is, the time efficiency is improved from the viewpoint of the user 2.

Moreover, when viewed from the automated driving vehicle 1 stopped in the downstream area 5D, the standard stop lot S0 exists rearward. Therefore, another vehicle 7 stopped in the standard stop lot S0 does not hinder the automated driving vehicle 1 from starting. Therefore, the processor 110 is able to easily make the automated driving vehicle 1 start moving. This is preferable from a viewpoint of vehicle travel control. In addition, the processor 110 is able to make the automated driving vehicle 1 depart without delay. This contributes not only to improvement in the time efficiency but also to reduction in the user 2's stress in the automated driving vehicle 1.

2-3. Pick-Up Following Drop-Off

After completion of the drop-off shown in FIG. 9, the automated driving vehicle 1 may pick up another user 2 in the same pick-up and drop-off area 5. In this case, after the completion of the drop-off, the processor 110 resets the target stop lot ST and performs the pick-up shown in FIG. 11. Since the automated driving vehicle 1 is stopped in the upstream area 5U at the time of the completion of the drop-off, the automated driving vehicle 1 is able to move to the downstream area 5D without going out of the pick-up and drop-off area 5. In other words, it is not necessary to go out of the pick-up and drop-off area 5 once, turn back the outside road, and then enter the pick-up and drop-off area 5 again. As described above, according to the present embodiment, it is possible to efficiently make a transition from the drop-off to the pick-up in the same pick-up and drop-off area 5.

2-4. Process of Switching Order of Priority

The stop lot information 300 includes both setting information of the order of priority used for the drop-off and setting information of the order of priority used for the pick-up. In Step S210 (see FIG. 7), the processor 110 switches the setting information to be used according to whether the automated driving vehicle 1 drops off or picks up the user 2. For example, whether a purpose of the stopping this time is the drop-off or the pick-up is registered in a travel plan of automated driving. The processor 110 refers to the travel plan to select and use the setting information of the order of priority.

3. Third Embodiment

A third embodiment is a modification example of the second embodiment. An overlapping description with the second embodiment will be omitted as appropriate.

3-1. Drop-Off

The third embodiment is basically the same as the second embodiment. That is, when the standard stop lot S0 is not available at the time of the drop-off, the upstream area 5U is preferentially used. However, if an available upstream stop lot SU is too far from the standard stop lot S0, the drop-off position is too far from the entrance of the facility 3 or too far from the position specified by the user 2. In such a case, it is not necessarily required to adhere to the upstream stop lot SU. It is also conceivable to use the downstream stop lot SD in the downstream area 5D instead of the upstream stop lot SU too far from the standard stop lot S0. In view of the above, according to the third embodiment, the order of priority of the plurality of stop lots S is set in consideration of a distance from the standard stop lot S0, for the purpose of flexible response.

Figure 12:
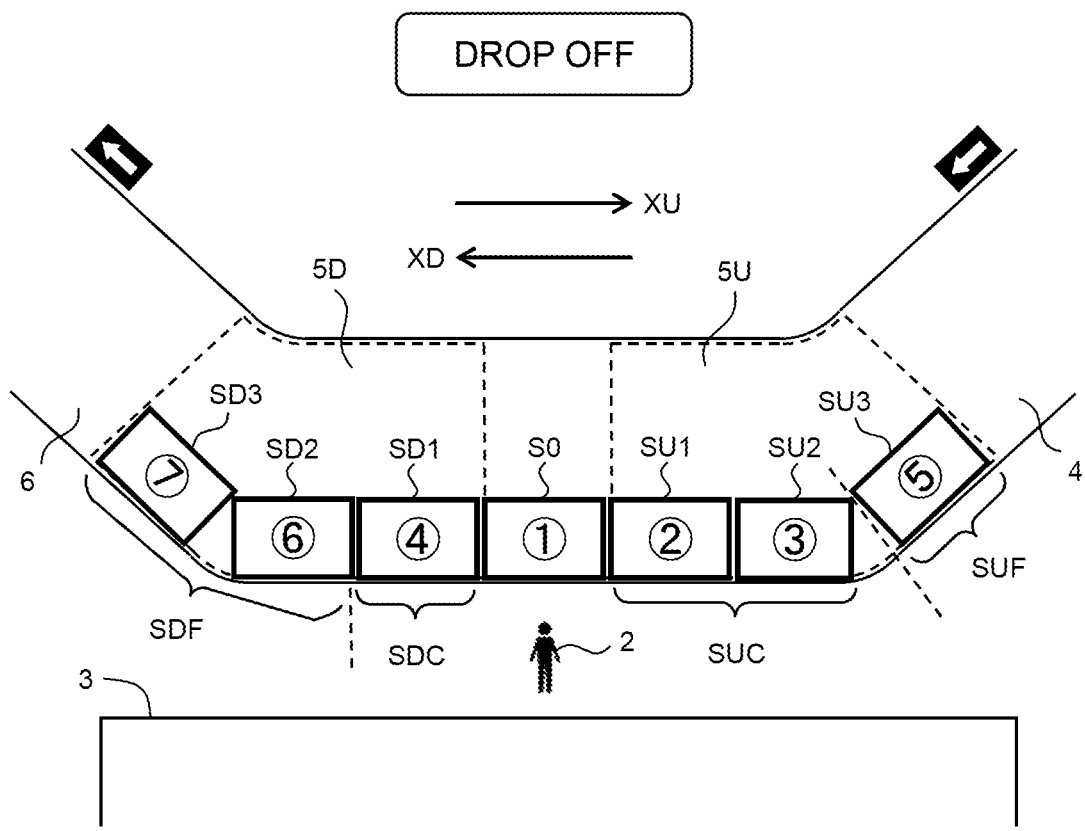
FIG. 12 is a conceptual diagram for explaining an example of the order of priority of the plurality of stop lots in a case of drop-off according to a third embodiment.

FIG. 12 is a conceptual diagram for explaining an example of the order of priority of the plurality of stop lots S in the case of the drop-off according to the third embodiment.

The upstream stop lots SU are classified into a nearby upstream stop lot SUC and a distant upstream stop lot SUF. The nearby upstream stop lot SUC is the upstream stop lot SU whose distance from the standard stop lot S0 is less than a first threshold DUth. On the other hand, the distant upstream stop lot SUF is the upstream stop lot SU whose distance from the standard stop lot S0 is equal to or larger than the first threshold DUth. In the example shown in FIG. 12, the upstream stop lots SU1 and SU2 are the nearby upstream stop lots SUC, and the upstream stop lot SU3 is the distant upstream stop lot SUF.

Similarly, the downstream stop lots SD are classified into a nearby downstream stop lot SDC and a distant downstream stop lot SDF. The nearby downstream stop lot SDC is the downstream stop lot SD whose distance from the standard stop lot S0 is less than a second threshold DDth. On the other hand, the distant downstream stop lot SDF is the downstream stop lot SD whose distance from the standard stop lot S0 is equal to or larger than the second threshold DDth. In the example shown in FIG. 12, the downstream stop lot SD1 is the nearby downstream stop lot SDC, and the downstream stop lots SD2 and SD3 are the distant downstream stop lots SDF.

The second threshold DDth is smaller than the first threshold DUth. As another example, the second threshold DDth may be equal to the first threshold DUth. In either case, the nearby downstream stop lot SDC is closer to the standard stop lot S0 than the distant upstream stop lot SUF is.

In the case of the drop-off, the order of priority is higher in an order of the nearby upstream stop lot SUC, the nearby downstream stop lot SDC, the distant upstream stop lot SUF, and the distant downstream stop lot SDF. In the example shown in FIG. 12, the order of priority is higher in an order of S0, SU1, SU2, SD1, SU3, SD2, and SD3.

Such the setting of the order of priority basically brings about the same result and effect as in the case of the second embodiment. However, only when the upstream stop lot SU available is too far from the standard stop lot S0, the nearby downstream stop lot SDC is used instead. Such the flexible response can prevent the target stop lot ST from becoming too far from the standard stop lot S0. As a result, the user 2's dissatisfaction caused by the target stop lot ST becoming too far from the standard stop lot S0 is reduced.

3-2. Pick-Up

Figure 13:
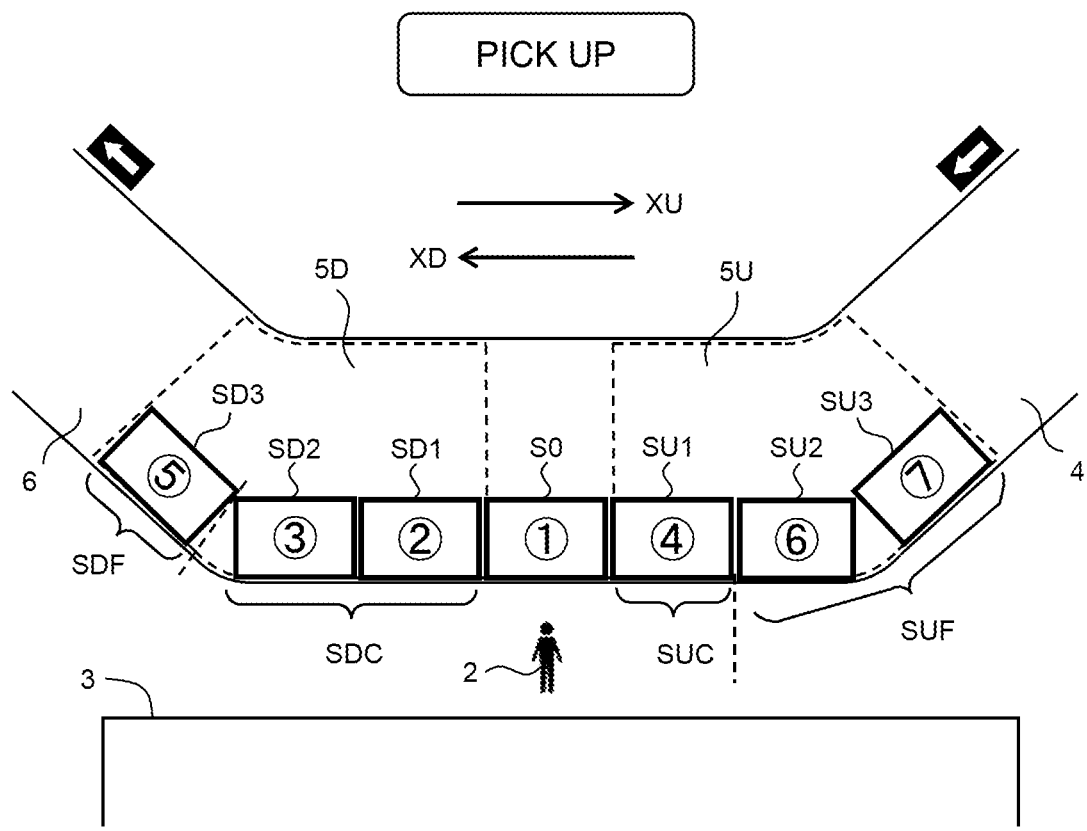
FIG. 13 is a conceptual diagram for explaining an example of the order of priority of the plurality of stop lots in a case of pick-up according to the third embodiment.

FIG. 13 is a conceptual diagram for explaining an example of the order of priority of the plurality of stop lots S in the case of the pick-up according to the third embodiment. In the example shown in FIG. 13, the upstream stop lot SU1 is the nearby upstream stop lot SUC, and the upstream stop lots SU2 and SU3 are the distant upstream stop lots SUF. The downstream stop lots SD1 and SD2 are the nearby downstream stop lots SDC, and the downstream stop lot SD3 is the distant downstream stop lot SDF. The first threshold DUth is smaller than the second threshold DDth. As another example, the first threshold DUth may be equal to the second threshold DDth. In either case, the nearby upstream stop lot SUC is closer to the standard stop lot S0 than the distant downstream stop lot SDF is.

In the case of the pick-up, the order of priority is higher in an order of the nearby downstream stop lot SDC, the nearby upstream stop lot SUC, the distant downstream stop lot SDF, and the distant upstream stop lot SUF. In the example shown in FIG. 13, the order of priority is higher in an order of S0, SD1, SD2, SU1, SD3, SU2, and SU3.

Such the setting of the order of priority basically brings about the same result and effect as in the case of the second embodiment. However, only when the downstream stop lot SD available is too far from the standard stop lot S0, the nearby upstream stop lot SUC is used instead. Such the flexible response can prevent the target stop lot ST from becoming too far from the standard stop lot S0. As a result, the user 2's dissatisfaction caused by the target stop lot ST becoming too far from the standard stop lot S0 is reduced.

3-3. Process of Switching Order of Priority

The stop lot information 300 includes both setting information of the order of priority used for the drop-off and setting information of the order of priority used for the pick-up. As in the case of the second embodiment, the processor 110 switches the setting information to be used according to whether the automated driving vehicle 1 drops off or picks up the user 2.

4. Fourth Embodiment

Figure 14:
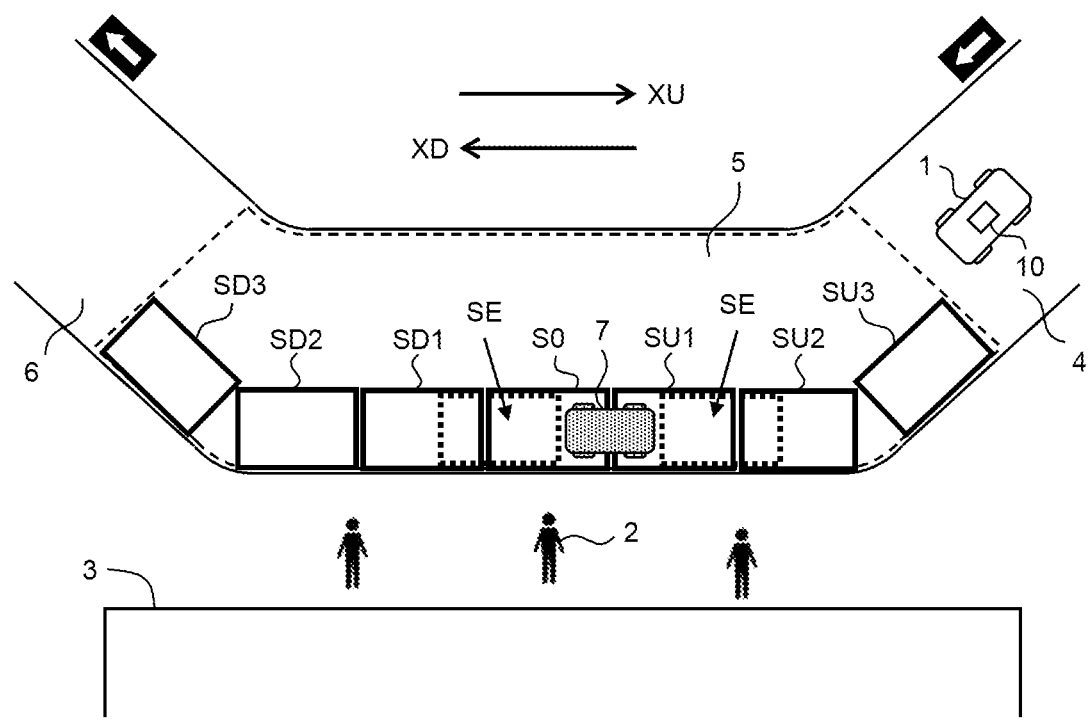
FIG. 14 is a conceptual diagram for explaining an example of updating the plurality of stop lots according to a fourth embodiment.

The arrangement of the plurality of stop lots S may be flexibly changed depending on a situation. For example, in a situation shown in FIG. 14, another vehicle 7 is stopped across (over) both the standard stop lot S0 and the upstream stop lot SU1. If the arrangement of the plurality of stop lots S is unchanged, both the standard stop lot S0 and the upstream stop lot SU1 are unavailable. This is not preferable in terms of the efficient use of the limited pick-up and drop-off area 5.

In view of the above, the processor 110 detects an available space SE adjacent to said another vehicle 7. The available space SE is required to have a size to an extent that the automated driving vehicle 1 can be stopped therein. Information on a size of the automated driving vehicle 1 (not shown) is registered in the automated driving system 10 in advance. The processor 110 detects the available space SE adjacent to said another vehicle 7 based on the surrounding situation information 230.

Figure 15:
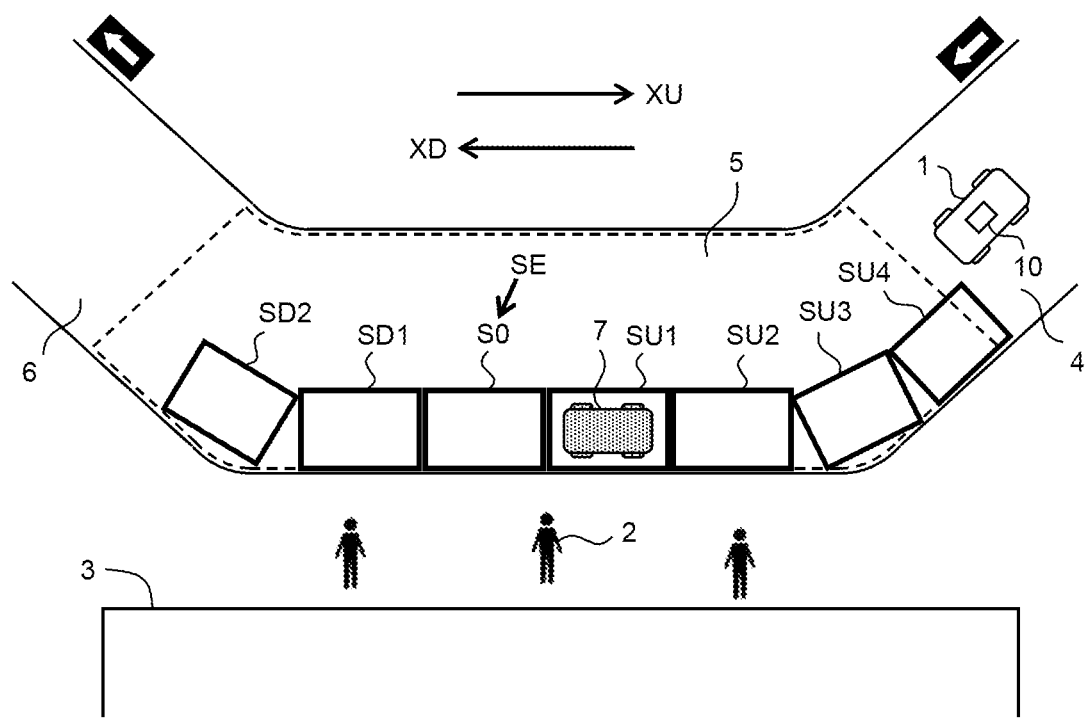
FIG. 15 is a conceptual diagram for explaining an example of updating the plurality of stop lots according to the fourth embodiment.

Then, as shown in FIG. 15, the processor 110 updates the plurality of stop lots S so that the available space SE becomes a new stop lot S. Updating the plurality of stop lots S means updating the stop lot information 300. That is, in Step S210 (see FIG. 7), the processor 110 updates the stop lot information 300 so that the available space SE becomes a new stop lot S. The processing thereafter is the same as in the case of the foregoing embodiments.

According to the fourth embodiment, as described above, when another vehicle 7 is stopped across two stop lots S, the plurality of stop lots S is updated so that the available space SE adjacent to said another vehicle 7 becomes a new stop lot S. As a result, it is possible to efficiently use the limited pick-up and drop-off area 5.

What is claimed is:

1. An automated driving system that controls an automated driving vehicle providing a driverless transportation service to a user, wherein a pick-up and drop-off area is a predetermined area in which the automated driving vehicle stops to pick up or drop off the user, and a plurality of stop lots are arranged in the pick-up and drop-off area, the automated driving system comprising:
a processor configured to control the automated driving vehicle; and
a memory configured to store stop lot information indicating positions and an order of priority of the plurality of stop lots, and surrounding situation information indicating a situation around the automated driving vehicle, wherein
the processor is further configured to:
select a stop lot of a highest order of priority among the plurality of stop lots based on the stop lot information;
execute a determination process that determines, based on the positions indicated by the stop lot information and the surrounding situation information, whether or not the selected stop lot is available for the automated driving vehicle to stop;
when the selected stop lot is not available for the automated driving vehicle to stop, select a stop lot of a next order of priority to execute the determination process;
when the selected stop lot is available for the automated driving vehicle to stop, set the selected stop lot as a target stop lot; and
control the automated driving vehicle so as to stop in the target stop lot; and
the plurality of stop lots not defined by actual marking lines are virtually arranged in the pick-up and drop-off area, wherein
a direction of vehicle travel in the pick-up and drop-off area is a first direction that is predetermined,
the plurality of stop lots include a standard stop lot that is predetermined or specified by the user; a downstream stop lot located in the first direction when viewed from the standard stop lot;
and an upstream stop lot located in a second direction opposite to the first direction when viewed from the standard stop lot,
the standard stop lot has the highest order of priority among the plurality of stop lots,
the processor sets the order of priority of the downstream stop lot and the upstream stop lot according to whether the automated driving vehicle drops off or picks up the user,
the upstream stop lot is classified into a nearby upstream stop lot whose distance from the standard stop lot is less than a first threshold and a distant upstream stop lot whose distance from the standard stop lot is equal to or larger than the first threshold,
the downstream stop lot includes a nearby downstream stop lot that is closer to the standard stop lot than the distant upstream stop lot is, and
in a case where the automated driving vehicle drops off the user, the order of priority is higher in an order of the nearby upstream stop lot, the nearby downstream stop lot, and the distant upstream stop lot.

2. The automated driving system according to claim 1, wherein a stop lot closer to the standard stop lot has a higher order of priority.

3. The automated driving system according to claim 1, wherein when another vehicle is stopped across two of the plurality of stop lots, the processor detects an available space adjacent to said another vehicle based on the surrounding situation information and updates the plurality of stop lots so that the available space becomes a new stop lot.

4. An automated driving system that controls an automated driving vehicle providing a driverless transportation service to a user, wherein a pick-up and drop-off area is a predetermined area in which the automated driving vehicle stops to pick up or drop off the user, and a plurality of stop lots are arranged in the pick-up and drop-off area, the automated driving system comprising:
a processor configured to control the automated driving vehicle;
and a memory configured to store stop lot information indicating positions and an order of priority of the plurality of stop lots, and surrounding situation information indicating a situation around the automated driving vehicle, wherein
the processor is further configured to:
select a stop lot of a highest order of priority among the plurality of stop lots based on the stop lot information;
execute a determination process that determines, based on the positions indicated by the stop lot information and the surrounding situation information, whether or not the selected stop lot is available for the automated driving vehicle to stop;
when the selected stop lot is not available for the automated driving vehicle to stop, select a stop lot of a next order of priority to execute the determination process;
when the selected stop lot is available for the automated driving vehicle to stop, set the selected stop lot as a target stop lot; and
control the automated driving vehicle so as to stop in the target stop lot; and
the plurality of stop lots not defined by actual marking lines are virtually arranged in the pick-up and drop-off area, wherein
a direction of vehicle travel in the pick-up and drop-off area is a first direction that is predetermined,
the plurality of stop lots include a standard stop lot that is predetermined or specified by the user; a downstream stop lot located in the first direction when viewed from the standard stop lot; and an upstream stop lot located in a second direction opposite to the first direction when viewed from the standard stop lot,
the standard stop lot has the highest order of priority among the plurality of stop lots,
the processor sets the order of priority of the downstream stop lot and the upstream stop lot according to whether the automated driving vehicle drops off or picks up the user,
the downstream stop lot is classified into a nearby downstream stop lot whose distance from the standard stop lot is less than a second threshold and a distant downstream stop lot whose distance from the standard stop lot is equal to or larger than the second threshold,
the upstream stop lot includes a nearby upstream stop lot that is closer to the standard stop lot than the distant downstream stop lot is, and
in a case where the automated driving vehicle picks up the user, the order of priority is higher in an order of the nearby downstream stop lot, the nearby upstream stop lot, and the distant downstream stop lot.

\* \* \* \* \*